United States Patent
Matsunaga et al.

[11] Patent Number: 6,020,696
[45] Date of Patent: Feb. 1, 2000

[54] CONTROL DEVICE AND METHOD FOR CONTROLLING SYNCHRONOUS MOTOR OF ELECTRIC VEHICLE

[75] Inventors: Yasuo Matsunaga; Kazuya Takahashi, both of Kanagawa; Hiroshi Katada; Eiichi Ohtsu, both of Ibaraki, all of Japan

[73] Assignees: Nissan Motor Co., Ltd., Kanagawa; Hitachi, Ltd., Tokyo, both of Japan

[21] Appl. No.: 08/988,986

[22] Filed: Dec. 11, 1997

[30] Foreign Application Priority Data

Dec. 11, 1996 [JP] Japan ................................. 8-331180

[51] Int. Cl.[7] ................................................. H02P 7/00
[52] U.S. Cl. ................................... 318/139; 318/717
[58] Field of Search ................................. 318/139, 375, 318/376, 799–815, 373

[56] References Cited

U.S. PATENT DOCUMENTS

| | | | |
|---|---|---|---|
| 4,479,080 | 10/1984 | Lambert | 318/373 |
| 5,412,293 | 5/1995 | Minezawa et al. | 318/376 |
| 5,569,995 | 10/1996 | Kusaka et al. | 318/717 |
| 5,583,406 | 12/1996 | Mutoh et al. | 318/376 |
| 5,723,956 | 3/1998 | King et al. | 318/139 |

*Primary Examiner*—Jonathan Salata
*Attorney, Agent, or Firm*—McDermott, Will & Emery

[57] ABSTRACT

An inverter main circuit has a DC link capacitor for driving a motor with a power of a battery. An inverter relay is arranged to feed a power of the battery to the inverter main circuit. An auxiliary relay is arranged to feed a power of the battery to the inverter main circuit through a resistor. A main key switch connects the battery to the inverter main circuit through the inverter and auxiliary relays when assuming ON, causing the motor to serve as a generator to charge the DC link capacitor when assuming OFF. When, upon turning the main key switch ON, a speed sensor senses that the rotation speed of the motor is within a predetermined range, a control unit turns the auxiliary relay ON, then the inverter relay ON after shorting armature coils of the motor with the aid of the inverter main circuit and then stops the shorting of the armature coils with the aid of the inverter main circuit.

8 Claims, 2 Drawing Sheets

CONTROL DEVICE AND METHOD FOR CONTROLLING SYNCHRONOUS MOTOR OF ELECTRIC VEHICLE

The contents of Japanese Patent Application 8-331180 filed Dec. 11, 1997 are hereby incorporated by reference.

BACKGROUND OF THE INVENTION

1. Field of the Invention

The present invention relates in general to electric vehicles, viz., the vehicles using an electric motor as a power plant, and more particularly the present invention relates to a device and a method for controlling the electric motor of the electric vehicles.

2. Description of the Prior Art

In order to clarify the task of the present invention, a conventional control device for the electric motor will be described with an aid of FIG. 1 which however shows an electric vehicle EV with a control device of the present invention.

The device has an inverter to convert DC power (viz., direct current power) from a battery "BAT" into AC power (viz., alternating current power) for controllably driving an AC electric motor used as a power plant of the electric vehicle.

In the control device, when, for starting the vehicle, a main key switch "MKS" is turned ON, relays "Ry1" and "Ry2" are turned ON and then an auxiliary relay "Ry4" is turned ON. Upon the ON-turning of the auxiliary relay "Ry4", a DC link capacitor "C1" starts charging of the electric power from the battery "BAT". Under this condition, due to presence of a resistor "R1", the charging current to the capacitor "C1" is controlled to a suitable lower level. When, with increase of the charging, a terminal voltage of the capacitor "C1" is raised up to a certain level, an inverter relay "Ry3" is turned ON. With this, the battery becomes directly connected to the capacitor "C1". Because, under this condition, the terminal voltage of the capacitor "C1" has been raised up to such a certain level, the direct connection of the battery "BAT" to the capacitor "C1" does not induce excessive current flow to the capacitor "C1".

In electric vehicles wherein a synchronous type is used as the motor, the motor serves as a generator when, under running of the vehicle, the main key switch "MKS" is kept OFF making the inverter inoperative. Thus, under this power off running, the capacitor "C1" can be charged by the motor (viz., generator) through diodes "D1", "D2", "D3", "D4", "D5" and "D6". The charging is so made that the terminal voltage of the capacitor "C1" depends on the running speed of the vehicle. Thus, it easily occurs that the terminal voltage of the capacitor "C1" is raised higher than that of the battery "BAT".

However, when, with the terminal voltage of the capacitor "C1" being higher than that of the battery "BAT", the main key switch "MKS" is returned ON (or reclosed), it tends to occur that excessive current is forced to flow from the capacitor "C1" to the battery "BAT" through the inverter relay "Ry3" and the main circuit relays "Ry1" and "Ry2", and/or excessive voltage is applied to an auxiliary equipment "AUX". The auxiliary equipment "AUX" shown in the drawing has one terminal connected to a line extending between the main circuit relay "Ry1" and the inverter relay "Ry3" and the other terminal connected to a line extending between the main circuit relay "Ry2" and one terminal of the capacitor "C1".

In order to avoid the above-mentioned drawbacks, various measures have been hitherto thought out, which are for example of a type to suppress the reclosing (viz., ON-returning) of the main key switch "MKS" unless the vehicle slows down to a certain lower level, a type to provide the control device with an electrically durable main circuit and a type to discharge the capacity "C1" through a resistor upon reclosing (viz., ON-returning) of the main key switch "MKS". However, even these measures have failed to exhibit satisfied results in obtaining easy operability, lower cost and downsizing of the control device.

SUMMARY OF THE INVENTION

It is therefore an object of the present invention to provide a device and a method for controlling a motor of an electric vehicle, which is free of the above-mentioned drawbacks.

That is, a main object of the present invention is to provide a control device for controlling a motor of an electric vehicle, which allows the reclosing of a main key switch during power off running of an electric vehicle, without aid of special equipments.

According to a first aspect of the present invention, there is provided a control device for controlling a synchronous electric motor of an electric vehicle. The device comprises, includes a battery, an inverter main circuit having a DC link capacitor for driving the motor with a power of the battery, an inverter relay for feeding a DC power of the battery to the inverter main circuit, a resistor, an auxiliary relay for feeding a DC power of the battery to the inverter main circuit through the resistor, a speed sensor for sensing a rotation speed of the motor, a main key switch for electrically connecting the battery to the inverter main circuit through the inverter and auxiliary relays when assuming ON position, and causing the motor to serve as a generator to charge the DC link capacitor when assuming OFF position, and a control unit. The control unit controls the inverter relay, the auxiliary relay and the inverter main circuit. Upon turning of the main key switch to ON position, the speed sensor senses that the rotation speed of the motor is within a predetermined range, the control unit turns the auxiliary relay ON, then turns the inverter relay ON after shorting armature coils of the motor with the aid of the inverter main circuit, and then suppresses the shorting of the armature coils with the aid of the inverter main circuit.

According to a second aspect of the present invention, there is provided, a method for energizing the inverter main circuit of the electric vehicle with power of the battery while the vehicle is under power off running with the main key switch kept OFF. The method includes sensing a rotation speed of the motor, turning the auxiliary relay ON if the sensed rotation speed is within a predetermined range, preventing the motor from generating any inductive voltage with the aid of the inverter main circuit when a terminal voltage of the battery is lower than a predetermined value, turning the inverter relay ON, and returning the motor to a normally operative condition with the aid of the inverter main circuit.

DETAILED DESCRIPTION OF THE INVENTION

Figure 1:
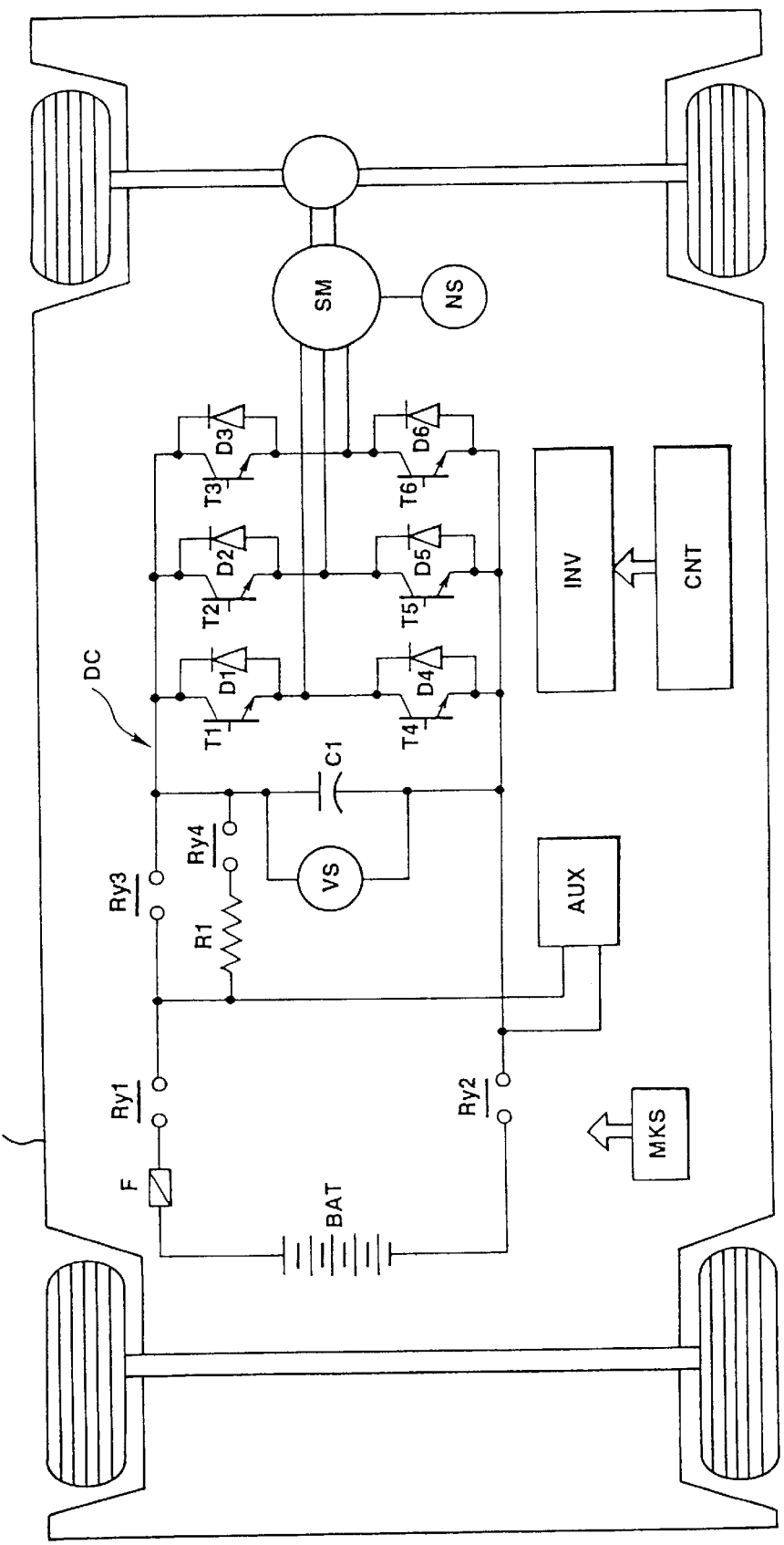
FIG. 1 is a schematic diagram of a control device of the invention.

Referring to FIG. 1, there is shown a control device 10 of the present invention.

A battery "BAT" is arranged, which feeds a high tension DC power to an inverter main circuit which has a DC link capacitor "C1" installed therein. The inverter main circuit comprises the DC link capacitor "C1", six transistors (IGBT) "T1" to "T6" and six diodes "D1" to "D6" which are connected in the illustrated manner. That is, the capacitor "C1" has a positive terminal connected to a positive bus bar to which collectors of the three transistors "T1", "T2" and "T3" are connected. The capacitor "C1" has a negative terminal connected to a negative bus bar to which emitters of the other three transistors "T4", "T5" and "T6" are connected. As shown, emitters of the transistors "T1", "T2" and "T3" are connected to collectors of the other transistors "T4", "T5" and "T6" respectively. The six-transistors "T1" to "T6" have respectively the diodes "D1" to "D6" connected thereto. The inverter main circuit functions to convert DC power from the battery "BAT" into AC power for driving a synchronous motor "SM" which is a power plant of an associated electric vehicle. As shown, the synchronous motor "SM" has three input lines, one being connected to a line extending between the transistors "T1" and "T4", one being connected to a line extending between the transistors "T2" and "T5", and the other being connected to a line between the transistors "T3" and "T6". The DC power from the battery "BAT" is also used for driving an auxiliary equipment "AUX", such as air conditioning device or the like.

As shown, between the battery "BAT" and the DC link, there are arranged a fuse "F", main circuit relays "Ry1" and "Ry2", an inverter relay "Ry3", a resistor "R1" and an auxiliary relay "Ry4" which are connected in the illustrated manner. That is, the fuse "F", the main circuit relay "Ry1" and the inverter relay "Ry3" are arranged on the positive bus bar. The other main circuit relay "Ry2" is arranged on the negative bus bar. The resistor "R1" is connected in series with the auxiliary relay "Ry4" to constitute a circuit which is arranged in parallel with the inverter relay "Ry3", as shown.

Operation and function of the main circuit relays "Ry1" and "Ry2", the inverter relay "Ry3", the auxiliary relay "Ry4" and the resistor "R1" at the time when, under standstill of the vehicle, the main key switch "MKS" is turned ON have been described in the part of the conventional device.

An inverter control circuit "INV" is arranged, which drives and controls the transistors "T1" to "T6" of the inverter main circuit, and a controller "CNT" is arranged, which controls the inverter control circuit "INV" and the relays "Ry1" to "Ry4". A voltmeter "VS" detects a terminal voltage "VB" (V) of the DC link condenser "C1", and a rotation speed sensor "NS" detects a rotation speed "NM" (rpm) of the synchronous motor "SM".

Figure 2:
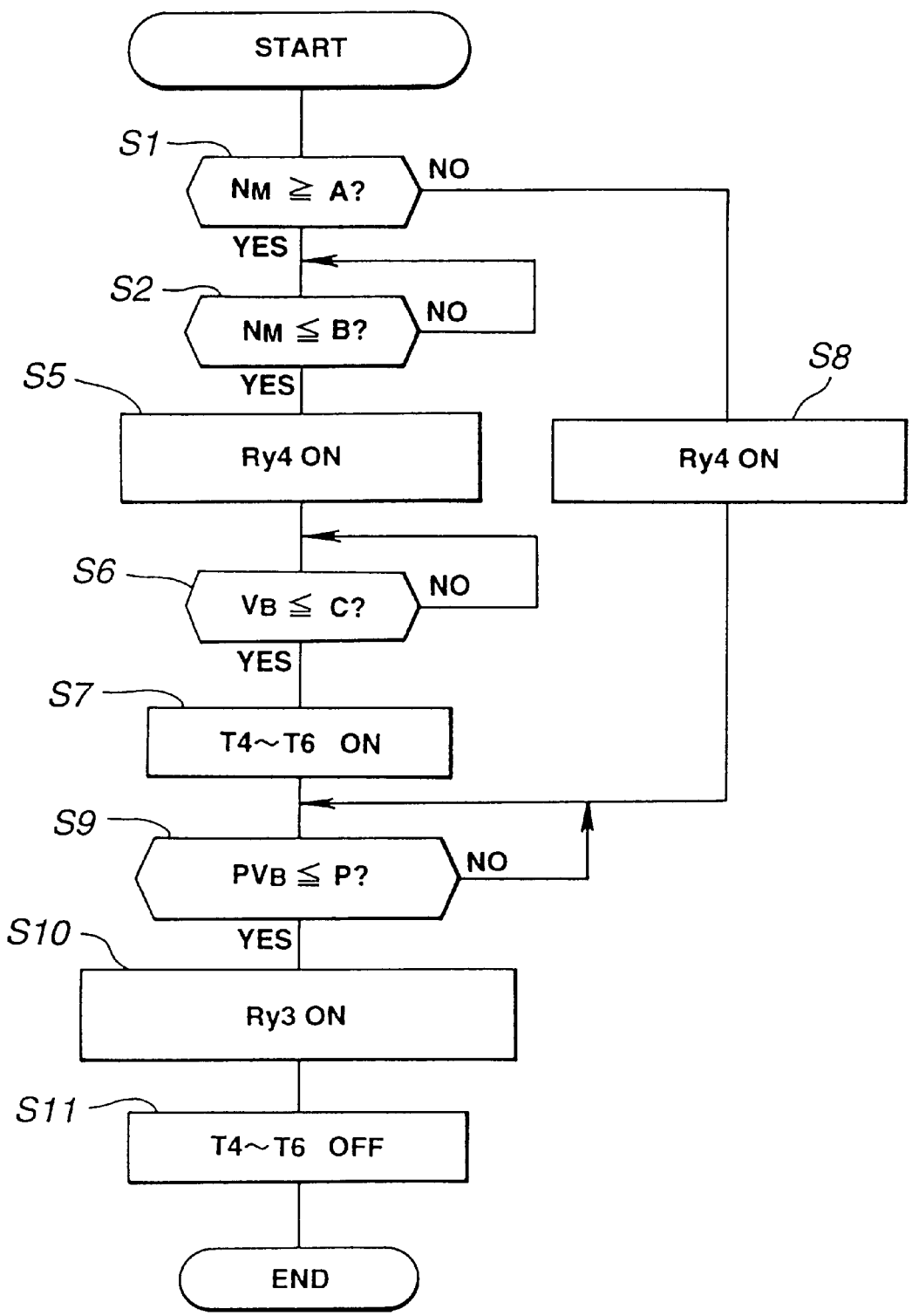
FIG. 2 is a flowchart depicting operation steps carried out in a control unit employed in the control device of the present invention.

FIG. 2 is a flowchart for depicting operation steps carried out in the controller "CNT" for controlling the relays "Ry1" to "Ry4" during power off running of an associated electric vehicle.

That is, when, under power off running of the vehicle, the main key switch "MKS" is turned ON, the controller "CNT" turns the main circuit relays "Ry1" and "Ry2" ON and starts processing the operation steps of the flowchart.

At step "S1", a judgment is carried out as to whether the rotation speed "NM" of the motor "SM" is higher than a first predetermined level "A" or not. Of course, "A" is not zero.

As has been mentioned hereinafore, under power running of the vehicle with the main key switch "MKS" kept OFF, the synchronous motor "SM" serves as a generator thereby charging the DC link capacitor "C1" through the diodes "D1" to "D6". In this case, the terminal voltage of the DC link capacitor "C1" increases in proportion to the vehicle speed, that is, the rotation speed "NM" of the motor "SM". As has been mentioned hereinafore, if the main key switch "MKS" is reclosed (returned ON) under a condition wherein the terminal voltage of the capacitor "C1" is relatively high, it tends to occur that excessive current is fed back to the battery "BAT" and excessive voltage is applied to the auxiliary equipment "AUX". The terminal voltage of the DC link capacitor "C1" is sensed when the main key switch "MKS" is turned ON, and when the terminal voltage is sufficiently low, the auxiliary relay "Ry4" is turned ON. Upon this ON-turning of the auxiliary relay "Ry4", certain charging current is fed to the DC link capacitor "C1" from the battery "BAT" through the resistor "R1" and the closed auxiliary relay "Ry4". However, even if the terminal voltage of the capacitor "C1" is low, such charging current is controlled by the resistor "R1", and thus, it never occurs that excessive current attacks the capacitor "C1".

In the present invention, the rotation speed "NM" of the motor "SM", which is proportional to the terminal voltage of the DC link capacitor "C1", is detected. A rotation speed "NM" which allows the charging current for the capacitor "C1" to be lower than a tolerance limit is determined as the first predetermined level "A".

When NO at step "S1", that is, when the rotation speed "NM" is lower than the first predetermined level "A", the operation flow goes to step "S8". At this step, the auxiliary relay "Ry4" is turned ON. While, YES at step "S1", that is, when the rotation speed "NM" is higher than or equal to the first predetermined level "A", the operation flow goes to step "S2". At this step, a judgment is carried out as to whether the rotation speed "NM" is lower than a second predetermined level "B" or not.

As has been mentioned hereinabove, while the vehicle is under power off running with the main key switch "MKS" kept OFF, the terminal voltage of the DC link capacitor "C1" increases in proportion to the rotation speed "NM" of the motor "SM" which is serving as a generator. If, with the terminal voltage of the capacitor "C1" being higher than that of the battery "BAT", the main key switch "MKS" is returned ON (viz., reclosed), it tends to occur that excessive current is fed from the capacitor "C1" to the battery "BAT" and/or excessive voltage is applied to the auxiliary equipment "AUX". In order to avoid this undesired phenomenon, it is necessary to restrain the ON-turning of the auxiliary relay "Rt4" until the terminal voltage of the DC link capacitor "C1" is lowered to a level of that of the battery "BAT".

In the present invention, for checking whether the terminal voltage of the capacitor "C1" is lowered to the level of that of the battery "BAT", the rotation speed "NM" of the motor "SM", which is proportional to the terminal voltage of the capacitor "C1", is practically used. A rotation speed "NM" which allows the terminal voltage of the capacitor "C1" to equalize with that of the battery "BAT" is determined as the second predetermined level "B". Of course, (|B|>|A|) is established.

When YES at step "S2", that is, when the rotation speed "NM" is lower than the second predetermined level "B", the operation flow goes to step "S5". At this step, the auxiliary relay "Ry4" is turned ON. Upon this, charging current is fed to the capacitor."C1" from the battery "BAT" through the resistor "R1" and the closed auxiliary relay "Ry4". However, since, in this case, the terminal voltage of the capacitor "C1" is substantially equal to that of the battery "BAT", the charging current is sufficiently small, and the auxiliary equipment "AUX" is protected from being attacked by excessive voltage.

Then, it becomes necessary to turn ON the inverter relay "Ry3". However, if the ON-turning of the relay "Ry3" is carried out under a condition wherein an excessively higher voltage produced by the motor "SM" (viz., generator) is kept applied to the DC link through the diodes "D1" to "D6", it tends to occur that the higher voltage is applied to the capacitor "C1" and the auxiliary equipment "AUX".

In the present invention, before carrying out the ON-turning of the inverter relay "Ry3", the transistors "T4" to "T6" of the inverter main circuit are turned ON to cause a short of armature coils of the motor "SM" making the motor "SM" (viz., generator) inoperative. After obtaining this condition, the inverter relay "Ry3" is turned ON.

That is, at step "S6", a judgment is carried out as to whether the terminal voltage "VB" of the battery "BAT" is lower than a predetermined voltage "C" or not. If YES, that, when the terminal voltage "VB" is lower than or equal to the predetermined voltage "C", the operation flow goes to step "S7". At this step, the transistors "T4" to "T6" are turned ON to short the armature coils of the motor "SM". (It is to be noted that when, at step "S1", it is judged that the rotation speed "NM" of the motor "SM" is lower than the first predetermined level "A", ON-turning of the transistors "T4" to "T6" for shorting the armature coils of the motor "SM" is not needed because the voltage produced by the motor "SM" (viz., generator) is very small.)

At step "S9", a judgment is carried out as to whether pulsation "PVB" of the voltage "VB" of the battery "BAT" is smaller than a predetermined level "P" or not. If YES, that is, when the pulsation "PVB" is smaller than or equal to the predetermined level "P", the operation flow goes to step "S10". At this step "S10", the inverter relay "Ry3" is turned ON. Then, the operation flow goes to step "S11". At this step "S11", the transistors "T4" to "T5" are turned OFF making the motor "SM" (viz., generator) operative. After finishing the above-mentioned operation steps, normal control is carried out for the motor "SM" by the controller "CNT".

Although the above description is directed to a case wherein the electric vehicle runs forward, the controlling by the present invention is applicable to another case wherein the vehicle runs backward. That is in this case, an absolute value of the rotation speed "NM" is treated as the rotation speed "NM".

What is claimed is:

1. A control device for controlling a synchronous electric motor of an electric vehicle, comprising:
    a battery;
    an inverter main circuit having a DC link capacitor for driving said motor with a power of said battery;
    an inverter relay for feeding a DC power of said battery to said inverter main circuit;
    a resistor;
    an auxiliary relay for feeding a DC power of said battery to said inverter main circuit through said resistor;
    a speed sensor for sensing a rotation speed of said motor;
    a main key switch for electrically connecting said battery to said inverter main circuit through said inverter and auxiliary relays when assuming ON position, and causing said motor to serve as a generator to charge said DC link capacitor when assuming OFF position; and
    a control unit for controlling said inverter relay, said auxiliary relay and said inverter main circuit,
    wherein when, upon turning of said main key switch to ON position, said speed sensor senses that the rotation speed of said motor is within a predetermined range, said control unit turns said auxiliary relay ON, then turns said inverter relay ON after shorting armature coils of said motor with the aid of said inverter main circuit, and then stops the shorting of the armature coils with the aid of said inverter main circuit.

2. A control device as claimed in claim 1, in which said control unit prevents said inverter and auxiliary relays from turning to ON positions when the motor rotation speed sensed by said speed sensor exceeds an upper limit of said predetermined range.

3. A control device as claimed in claim 1, in which a lower limit of said predetermined range is so determined as to make a current appearing between an inductive voltage generated by said motor and a terminal voltage of said battery lower than a predetermined level.

4. A control device as claimed in claim 1, in which an upper limit of said predetermined range is so determined that an inductive voltage generated by said motor is lower than an endurance limit voltage of said DC link capacitor and that of an auxiliary equipment connected to said motor through said inverter main circuit.

5. A control device as claimed in claim 1, in which the shorting of the armature coils of said motor is carried out by simultaneously turning three transistors of said inverter main circuit ON, said three transistors being arranged at a negative electrode side of said battery.

6. A control device as claimed in claim 1, in which said inverter relay and said auxiliary relay are arranged in parallel with each other.

7. In an electric vehicle including an electric motor serving as a power plant of said vehicle, a battery, an inverter main circuit having a DC link capacitor for driving said motor with a power of said battery, an inverter relay for feeding a DC power of said battery to said inverter main circuit; an auxiliary relay for feeding a DC power of said battery to said inverter main circuit through a resistor; and a main key switch for electrically connecting the battery to said inverter main circuit through said inverter and auxiliary relays when assuming ON position and causing said motor to serve as a generator to charge said DC link capacitor when assuming OFF position,
    a method for energizing the inverter main circuit with a power of said battery while the vehicle is under power off running with the main key switch kept OFF, comprising the steps of:
    (a) sensing a rotation speed of said motor;
    (b) turning said auxiliary relay ON if the sensed rotation speed is within a predetermined range;
    (c) preventing said motor from generating any inductive voltage with the aid of said inverter main circuit when a terminal voltage of said battery is lower than a predetermined value;
    (d) turning said inverter relay ON; and
    (e) returning said motor to a normally operative condition with the aid of said inverter main circuit.

8. A method as claimed in claim 7, further comprising between the steps (c) and (d), (c') checking whether pulsation of a terminal voltage of said battery is smaller than a predetermined level.

* * * * *